(12) United States Patent
Owens et al.

(10) Patent No.: US 9,648,133 B2
(45) Date of Patent: May 9, 2017

(54) OPTIMIZING TRAFFIC LOAD IN A COMMUNICATIONS NETWORK

(75) Inventors: Peter J. Owens, Port Moody (CA); Brian Kean, Cincinnati, OH (US); George Apostolopoulos, San Jose, CA (US)

(73) Assignee: TELEFONAKTIEBOLAGET L M ERICSSON, Stockholm (SE)

( * ) Notice: Subject to any disclaimer, the term of this patent is extended or adjusted under 35 U.S.C. 154(b) by 371 days.

(21) Appl. No.: 13/417,514

(22) Filed: Mar. 12, 2012

(65) Prior Publication Data
US 2013/0235868 A1    Sep. 12, 2013

(51) Int. Cl.
H04L 29/08    (2006.01)

(52) U.S. Cl.
CPC .......... *H04L 67/32* (2013.01); *H04L 67/1002* (2013.01); *H04L 67/327* (2013.01)

(58) Field of Classification Search
CPC .... H04L 67/32; H04L 67/1002; H04L 67/327
USPC ........................................................ 370/389
See application file for complete search history.

(56) References Cited

U.S. PATENT DOCUMENTS

| | | | | |
|---|---|---|---|---|
| 6,598,034 B1* | 7/2003 | Kloth | ................... | H04L 12/2602 370/338 |
| 7,254,626 B1* | 8/2007 | Kommula | ........... | H04L 67/1008 709/217 |
| 7,796,014 B2* | 9/2010 | Traub | .................... | H04L 65/607 235/375 |
| 8,955,107 B2* | 2/2015 | Eyada | ................. | H04L 63/0263 726/1 |
| 9,014,026 B2* | 4/2015 | Raleigh | ........... | G06Q 10/06375 370/252 |
| 2003/0005425 A1* | 1/2003 | Zee | .......................... | G06F 8/41 717/166 |
| 2006/0117099 A1* | 6/2006 | Mogul | .................. | H04L 43/026 709/223 |
| 2007/0110046 A1* | 5/2007 | Farrell | .................... | H04L 69/04 370/389 |
| 2007/0195814 A1* | 8/2007 | Barrie | ................. | H04L 63/0236 370/463 |
| 2007/0233823 A1* | 10/2007 | Traub | .................... | H04L 65/607 709/220 |
| 2010/0049842 A1* | 2/2010 | Koski | ................. | H04L 67/2814 709/223 |

(Continued)

OTHER PUBLICATIONS

Hinrichs, S., "Policy-Based Management: Bridging the Gap", Proceedings/15th Annual Computer Security Applications Conference, Dec. 6-10, 1999, pp. 209-218, IEEE Computer Society, Los Alamitos, California.

(Continued)

*Primary Examiner* — Jae Y Lee
(74) *Attorney, Agent, or Firm* — Patents on Demand P.A.; Brian K. Buchheit; Scott M. Garrett

(57) ABSTRACT

Each application executing on an application server uses an extended version of the Berkeley Packet Filter (BPF) language to define an application-specific rule set. The application server also includes a Just-In-Time compiler to compile the BPF rule set. The compiled rule set is downloaded to a Packet Forwarding Entity (PFE) in the network, and used to control how the PFE steers data packets generated by the application through a communications network.

48 Claims, 7 Drawing Sheets

(56) References Cited

U.S. PATENT DOCUMENTS

| | | | |
|---|---|---|---|
| 2010/0103837 A1* | 4/2010 | Jungck | H04L 29/12066 370/252 |
| 2010/0246593 A1* | 9/2010 | Belanger | H04L 47/2483 370/419 |
| 2010/0293535 A1* | 11/2010 | Andrade | G06F 8/44 717/156 |
| 2012/0002668 A1* | 1/2012 | Lariviere | G06F 13/4022 370/355 |
| 2012/0005663 A1* | 1/2012 | Burckart | G06F 9/445 717/166 |
| 2012/0057598 A1* | 3/2012 | Wang et al. | 370/392 |
| 2012/0231824 A1* | 9/2012 | Budic et al. | 455/507 |
| 2013/0003736 A1* | 1/2013 | Szyszko | H04L 47/2441 370/392 |
| 2013/0070622 A1* | 3/2013 | Degioanni et al. | 370/252 |
| 2013/0124686 A1* | 5/2013 | Hurlin | G06F 11/3664 709/218 |
| 2013/0176848 A1* | 7/2013 | Jinzaki | 370/230.1 |
| 2013/0227521 A1* | 8/2013 | Bourd | G06F 11/3604 717/110 |
| 2013/0279334 A1* | 10/2013 | Xu et al. | 370/235 |

OTHER PUBLICATIONS

Bartal, Y., et al. "Firmato: A Novel Firewall Management Toolkit", Proceedings of the 1999 IEEE Symposium on Security and Privacy, May 9, 1999, pp. 17-31, Los Alamitos, California.

* cited by examiner

OPTIMIZING TRAFFIC LOAD IN A COMMUNICATIONS NETWORK

FIELD OF THE INVENTION

The present invention relates generally to communications networks, and more particularly to systems and methods for steering packets through a communications network.

BACKGROUND

Service Routers (SRs) are network devices capable of supporting a variety of different types of services, such as Voice over IP (VoIP) telephony services. As is known in the art, each different type of service may be associated with a different type of application hosted on one or more application servers. To support the different types of services, the SR hosts a server load balancing (SLB) function that dynamically balances the traffic load from the different applications. Particularly, the SLB function distributes the traffic load by forwarding data packets generated by the different applications and received at the SR to multiple servers or processing units.

Conventional SLB functions usually balance the traffic load based on the type of application that generated the traffic. For example, application servers that send Electronic Programming Guides (EPGs) to set top boxes typically encapsulate data in General Packet Radio Service (GPRS) Tunneling Protocol (GTP) packets. Thus, upon receipt of such GTP packets at the SR, the SLB function would forward those packets to a server or processing unit via an appropriate port or interface associated with the forwarding of those types of packets. As another example, a proxy communicating data packets using the HyperText Transfer Protocol (HTTP) requires traffic to be sent and received over port 80/8080. As such, the SLB function would forward received HTTP packets to a server or processing unit via port 80/8080. Regardless of the type of application or service that generates the data packets, however, conventional SLB functions forward traffic to an appropriate processing unit based on the type of application that generated the data packet.

Conventionally, the SLB function utilizes two main approaches to balance the traffic load at the SR. The first approach uses an Access Control List (ACL) to steer traffic to a destination. Particularly, the SLB function first analyzes incoming data packets to determine predefined information, such as a source address for the data packet. The SLB function then accesses the ACL based on the determined source address to identify a corresponding destination address for the data packet. Once the SLB function has determined the appropriate destination address, it forwards the data packet to the destination address in accordance with a predefined rule. However, such a conventional load balancing approach, although useful, is tied to certain, limited information. Particularly, packets may be steered through the network only according source and/or destination address, type of protocol, and/or source and destination port.

In the second approach, the applications that generate the data packets explicitly code a fixed bit field in each data packet with predefined bits that identify the destination. Upon receiving the packet, the SLB function extracts the predefined bits from the fixed bit field for use in selecting, and forwarding the packet to, an appropriate destination processing unit. This approach is also useful, but not without its problems. As stated above, the load balancing rules are different for each type of application that sends data packets to the SR. Therefore, new forwarding path code must be developed and hosted at the SR to be able to support each new application type. Such a practice is resource intensive.

For example, the need to develop new code can complicate the process of porting applications already supported at the SR to and/or from other platforms. Additionally, the forwarding path component at the SR needs to be re-coded for each new application type. However, it is difficult to add new application-specific forwarding code into an existing forwarding plane. Further, any new code could have unwanted interactions with existing load balancing code, or there may be resource issues associated with some applications. It is difficult to optimize the various pieces of forwarding code because the code for each application type is independently developed. Such lack of optimization may lead to the inefficient usage of forwarding plane resources.

SUMMARY

The present invention provides a system and method for optimally applying a set of steering rules at a packet forwarding entity (PFE) in a communications network. Particularly, one or more PFEs are communicatively connected to one or more application servers (ASs) via a packet data network. The ASs each host one or more applications to provide a variety of different services to end users. Each application, which may provide a different type of service, uses the Berkeley Packet Filter (BPF) language to generate a set of application-specific steering rules for each of the PFEs. These rules control how data packets generated by a given application are steered at the PFE.

To efficiently implement steering control at the PFE, the applications describe their specific rule sets and associated data as text in a BPF source file. The applications then compile the source file using a Just-In-Time (JIT) compiler at the AS before downloading the compiled file to one or more of the PFEs. The JIT compiled file contains instructions native to the platform of the PFE, and may be optimized according to one or more characteristics of the network. At runtime, the PFE steers data packets generated by a given application through the network in accordance with the JIT compiled rules and constraints set forth by the given application.

Of course, those skilled in the art will appreciate that the present invention is not limited to the above contexts or examples, and will recognize additional features and advantages upon reading the following detailed description and upon viewing the accompanying drawings.

DETAILED DESCRIPTION

The present invention provides a system and method for optimally applying a set of steering rules at a packet forwarding entity (PFE) in a communications network. Particularly, the PFE receives data packets generated by a plurality of different types of applications hosted on one or more application servers. Prior to sending traffic to the PFE, however, each application uses the Berkeley Packet Filter (BPF) language to generate a set of application-specific steering rules to control how its data packets are steered at the PFE. As is known in the art, the BPF is a conventional mechanism that allows network entities, such as the PFE, to "filter" incoming data packets to determine specific packets of interest. However, the present invention extends this conventional BPF mechanism to also allow the different applications to control the steering behavior at the PFE for their packets.

In one embodiment of the present invention, each application executing on an application server uses the BPF language to generate its own BPF-based rule set defining how a given PFE is to steer packets generated by the application. Some PFEs may not be capable of interpreting BPF-based rule sets, or if they are, may not be able to interpret such BPF rule sets with acceptable performance. Further, not all PFEs have the same operating platform. Therefore, the present invention uses a Just-In-Time (JIT) compiler to generate a code file from each application-specific BPF rule set. Each JIT compiled code file includes efficient forwarding code that is native to each PFE platform that will receive the code file. Once the code files are downloaded to and installed on their corresponding PFEs, data packets generated by the different applications are received at the PFEs and steered through the network in accordance with the appropriate compiled code file.

The use of the BPF language and the JIT compiler for steering application packets provides benefits that conventional methods of steering data packets do not provide. For example, use of the extended BPF language allows applications to define specific fields or bits within its packets that are to be extracted at the PFE and used to steer the packet. Such steering may help to balance a load in the network, for example. Additionally, use of the JIT compiler to compile the BPF-based source file (i.e., the application-specific BPF rule set) enables network operators to deploy new and/or different types of applications without having to first provide each different PFE with corresponding forwarding code customized specifically for that operating platform.

Figure 1:
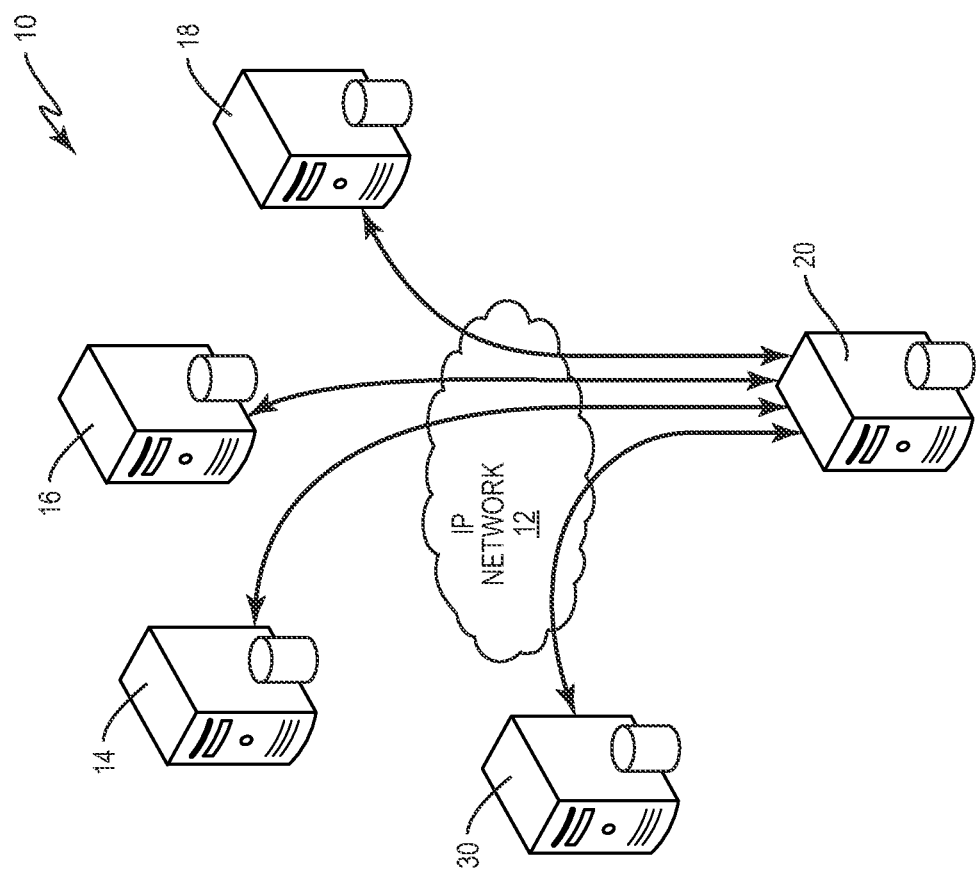
FIG. 1 is a block diagram illustrating some of the components of an exemplary communications network configured according to one embodiment of the present invention.

Turning now to the drawings, FIG. 1 is a block diagram illustrating a communications system 10 configured to operate according to one embodiment of the present invention. As seen in FIG. 1, system 10 comprises an IP network 12, such as the Internet, for example, that communicatively interconnects a plurality of servers 14, 16, 18 with a PFE 20 and an application server (AS) 30. Those skilled in the art will appreciate that although only a single PFE 20 and a single AS 30 are shown, this is for illustrative purposes only and that the present invention is suited for use by multiple PFEs 20 and ASs 30.

According to one or more embodiments of the present invention, the application server 30 includes a plurality of different types of applications. Each type of application performs one or more different services (e.g., VoIP services) for end users. According to the present invention, each application generates its own set of application-specific steering rules using an extended BPF language. As previously stated, the extended BPF language allows each application to define filtering information, as is conventional, to allow the PFE 20 to identify "packets of interest." However, according to the present invention, the extended BPF language also allows each application to define or control how the PFE 20 steers its data packets through the network 12.

Additionally, as will be described later in more detail, the application server 30 comprises a JIT compiler for just-in-time compiling each set of application-specific steering rules into native code for the PFE 20. The JIT compiler is a software program that is well-known in the art. Thus, the specifics of the JIT compiler are not described in detail herein. For the present invention, however, it is sufficient to understand that, the application generates and saves its rule set as a BPF source file. The application server 30 then utilizes the JIT compiler to "just-in-time compile" the source file. Once compiled, the application server 30 then uploads the resultant native code file to the PFE 20.

The PFE 20 comprises a computing device, such as a router, for example, configured to forward data packets through the network. In operation, each PFE 20 receives the native code file from the application server and stores it in memory. As stated above, the native code file contains the rules, functions, and data needed by the PFE 20 to steer the data packets generated by a given application through the network. A filtering mechanism executing on the PFE 20 receives the data packets and, as is conventional, filters the packets to determine whether any are "packets-of-interest." In addition, however, the filtering mechanism at the PFE 20 also steers the incoming data packets through the network to one of the servers 14, 16, 18 in accordance with the native code file compiled at the AS 30.

Figure 2:
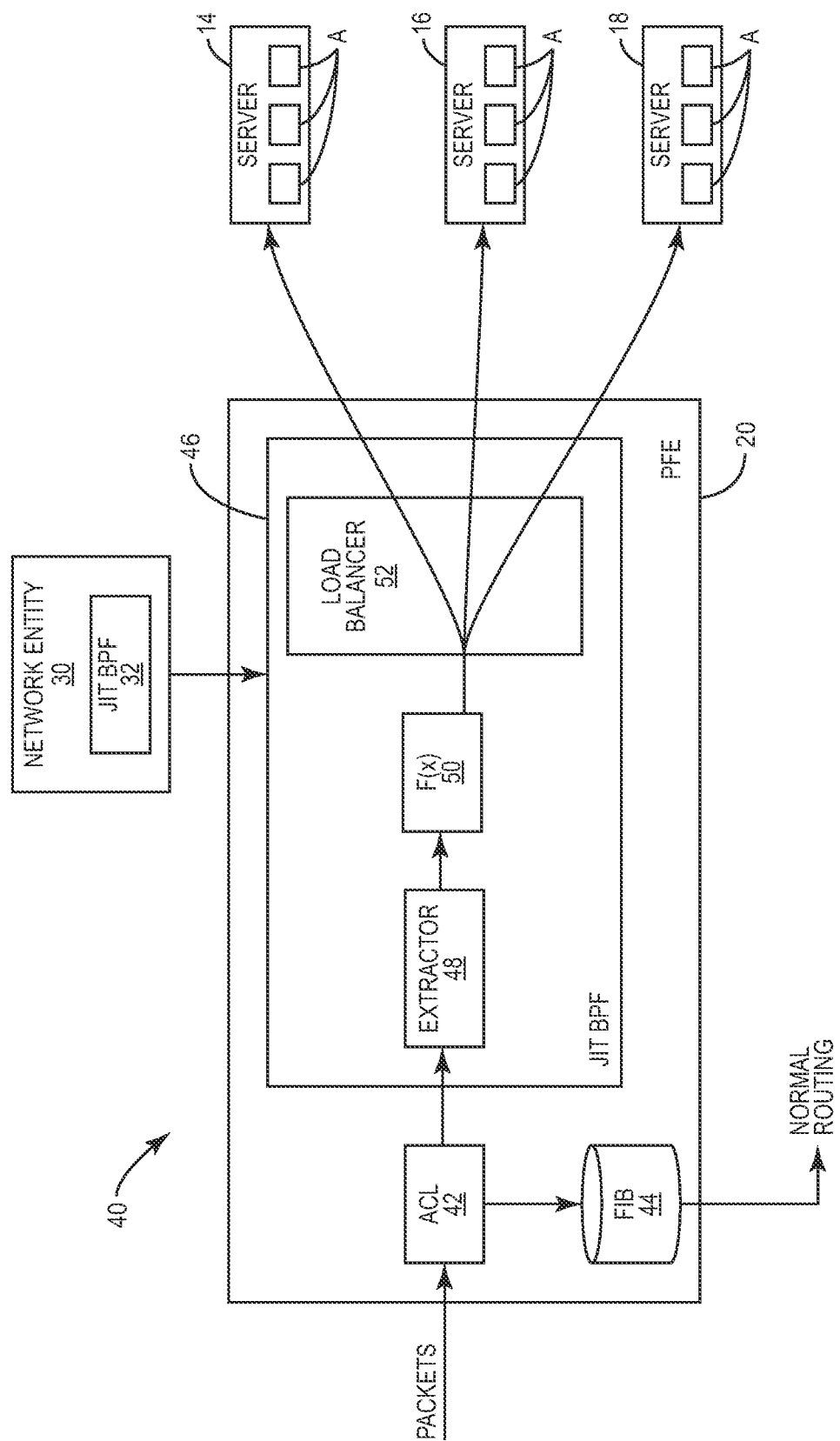
FIG. 2 is a functional block diagram illustrating the operation of an exemplary Packet Forwarding Entity (PFE) configured according to one embodiment of the present invention.

FIG. 2 is a block diagram that illustrates a packet filtering mechanism 40 at a PFE 20 configured to filter and steer data packets according to one or more embodiments of the present invention. As seen in FIG. 2, the filtering mechanism comprises an access control list (ACL) 42, a Forwarding Information Base (FIB) 44 or other forwarding table, and the just-in-time compiled code file 46. As stated above, the JIT compiler at the AS 30 compiles the BPF source file containing the application-specific rule set 32 to generate the code file 46. The AS 30 then uploads the code file 46 to the PFE 20 for storage in memory. In one embodiment, the JIT compiled code file 46 comprises an extractor 48, a steering function 50, and a load balancer 52.

In operation, one or more of the applications executing on AS 30 generate data packets to send to the PFE 20. In one embodiment, a given application may generate some or all of its data packets to include filtering information (i.e., to identify which data packets generated by the given application are to be steered) and/or steering information (i.e., to identify a destination where the data packets generated by the given application are to be steered). The filtering information and/or the steering information may be placed any-where in the packet, but in one embodiment, comprises one or more bits inserted into the header of the data packets.

Upon receipt of the data packets, the ACL 42 analyzes the filtering information to determine which of the incoming packets are considered "packets of interest," and which are not. If a given packet is not "of interest," the ACL 42 simply forwards the data packet to the FIB 44 or other forwarding table. The FIB 44 then determines a destination address for the packet and forwards the packet to that address, as is conventional. However, those packets that are "of interest" are forwarded to the JIT compiled code file 46 for further processing in accordance with the present invention.

Particularly, the JIT compiled code file 46, as stated above, contains instructions native to the platform of PFE 20, and data. The instructions and data function to steer data packets generated by a particular application through the network in accordance with the rules and constraints set forth by the application. Upon receiving an incoming packet from the ACL 42, the extractor 48 extracts the steering information from the data packet. The extracted data may be, for example, one or more bits at predetermined locations in the header of the data packet. The steering function 50, which is an extended BPF code snippet compiled into the native code file 46, then executes on the extracted bits. Particularly, the steering function 50 calculates a load balancing ID based on the extracted bits for use in steering the packet to balance a traffic load. The data packet, and the calculated load balancing ID, is then forwarded to the load balancer 52 to determine a destination for the data packet based on the calculated load balancing ID. The destination may be, for example, one of the servers 14, 16, 18, or a specified application A executing on one of the servers 14, 16, 18.

Figure 3:
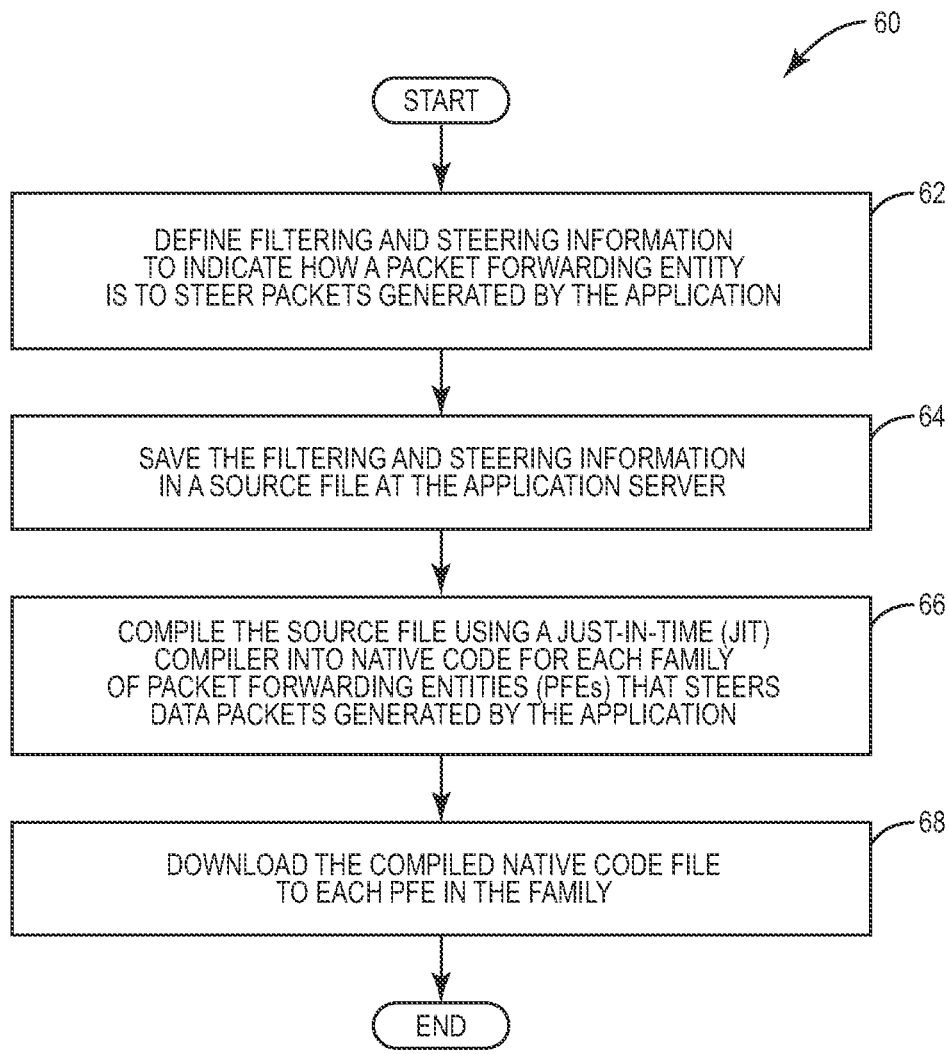
FIG. 3 is a flow chart illustrating an exemplary method of provisioning a PFE with an application-centric Just-In-Time (JIT) compiled Berkeley Packet Filter (BPF) file that defines the filtering and packet steering processing for packets sent by the application according to one embodiment of the present invention.

FIG. 3 is a flow chart illustrating a method 50 by which an application executing on AS 30 generates the JIT compiled code file 46 according to one embodiment of the present invention. As seen in FIG. 3, the application first defines the application-specific filtering and steering rules to control how the PFE 20 steers data packets generated by the application to a desired destination (box 62). This information defines the specific type of information that the PFE 20 should extract from each packet "of interest" and use as input to steer the data packets. For example, a subscriber-based application may determine that a source and/or destination address is sufficient with which to steer its generated data packets at the PFE 20. Similarly, TCP flow-based applications may determine that source and destination IP ports, as well as a protocol version, are needed to steer its packets in addition to full source and destination IP addresses.

The application also generates the necessary source code for the steering function 50 that executes on the data extracted from the incoming data packets, as well as the size and data for the load balancer 52. The application may generate other information as well; however, whatever information is required for filtering and/or steering its packets at the PFE 20, the application defines that information using the extended BPF language.

Once the application has determined the type of information that the PFE 20 should use to steer the data packets, the application describes that information and the steering function to execute on the incoming data packets in the extended BPF language, and saves the information to a source file (box 64). Such information may describe tables or other data structures that describe the application-specific rules for steering its data packets, and/or one or more optimizations that may occur at run-time. In one embodiment, the application defines one or more specific hardware components at the PFE 20 to operate on the data packet. Defining specific components may help to ensure that specific actions or functions are performed on its data packets.

The application then invokes the JIT compiler to compile the BPF source file into the code file 46 (box 66). JIT compilers and their operation are well-known in the art. Therefore, the specific details of how the JIT compiler generates the code file 46 are not described herein. However, it is sufficient to say that the JIT compiler generates the code file 46 from the BPF file for the PFE 20, and that the resultant code file 46 may also be used on any PFE having the same operating platform as the PFE 20. The compiled code file 46 is then downloaded to the PFE 20, and may be downloaded to one or more other PFEs having the same operating platform (box 68).

Figure 4:
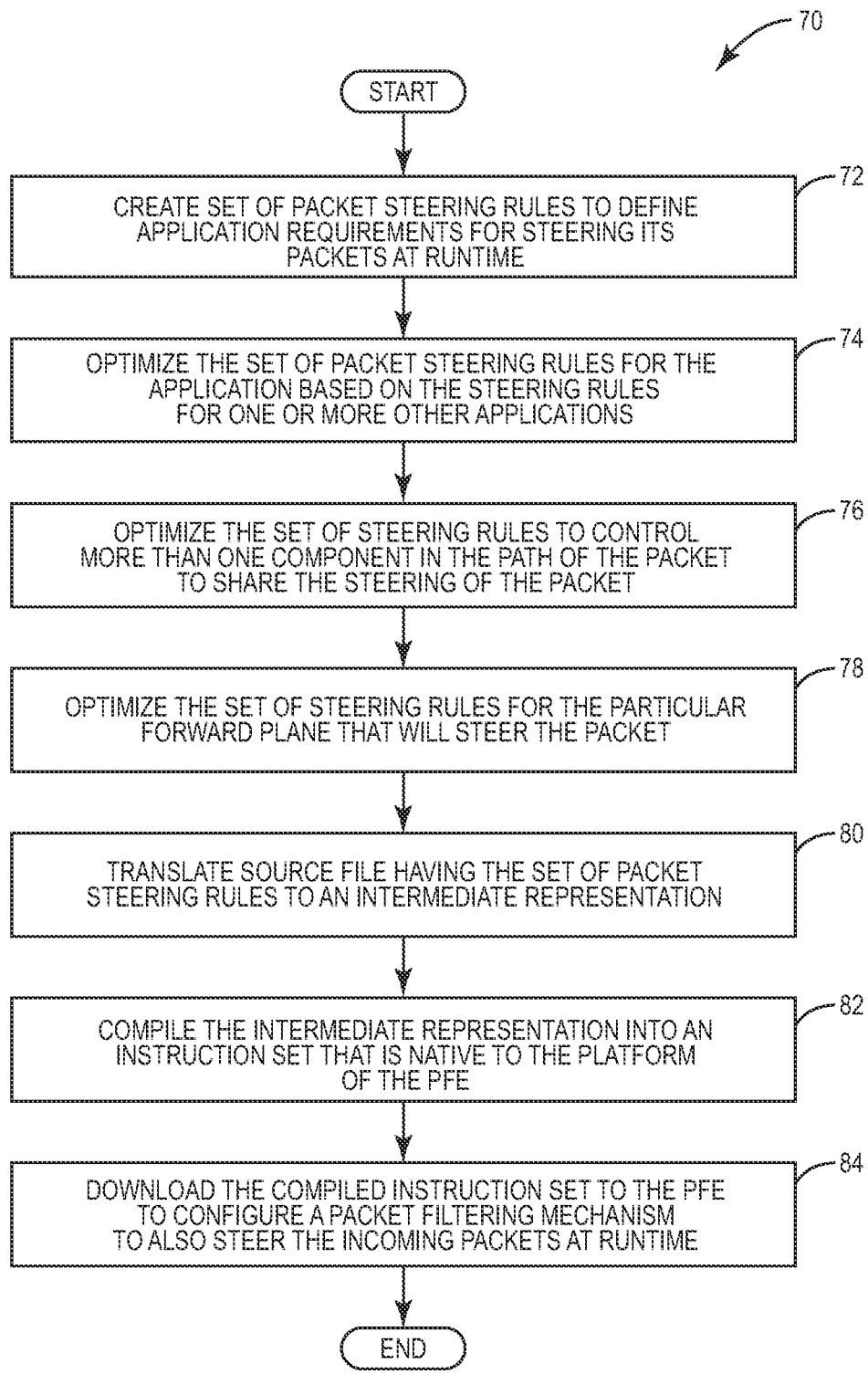
FIG. 4 is a flow chart illustrating an exemplary method of generating the steering rules that govern the steering of the application packets according to one embodiment of the present invention.

FIG. 4 is a flow chart illustrating a more detailed method 70 of generating the steering rules that govern the steering of the application data packets according to one embodiment of the present invention. Method 70 begins with the application at AS 30 creating the set of packet steering rules that control how the PFE 20 will steer its packets at run-time (box 72). The steering rules may comprise any data and instructions needed or desired, but in one embodiment, the packet steering rules are generated on a per-application basis and in accordance with an Application Programming Interface (API) associated with the filtering mechanism at the PFE 20. The API includes functions and data used to filter the incoming packets at the PFE 20, as well as to steer the incoming packets arriving at the PFE 20.

For example, the API may include functions that allow the application to generate the rule set to include data associating a given incoming packet with one or more predetermined destinations in the network. Additionally, the API may contain functions that allow the application to identify one or more fields and/or bits in the incoming data packets to extract and use as input into a steering function executing at the PFE 20. Alternatively, or additionally, the API may allow the application to generate or identify one or more policies (e.g., load balancing policies) of the network, and/or one or more performance requirements of the application that sending the data packet.

The application may then, in some embodiments, optimize the generated steering rules. For example, the application may optimize its generated steering rules based on an analysis of the steering rules of one or more other applications executing on the application server (box 74). Particularly, the application will have access to the steering rules for multiple applications executing on the AS 30. Such access allows the application to merge the steering requirements from each of a plurality of different applications into a unified steering specification. The ability to selectively merge the steering rules across applications allows any given application to perform various meaningful optimizations of the PFE 20, such as using the ACL 42 and FIB 44 for some data packets to maximize performance.

The application may also optimize its generated steering rules to control multiple different steering components at the PFE 20 to share the steering load (box 76). Such an optimization could allow the application to maximize the use of the available hardware and performance. For example, a typical steering destination for an application data packet is an application executing on a controller or services card at a server. In some systems, however, it may be more efficient to split the steering function such that the steering occurs at one or more line cards at the PFE 20. The line cards will provide a more coarsely grained steering for the packets; however, such coarse steering may be sufficient with which to determine, and steer the packet to, an appropriate destination services card. Once at the destination services card, the steering for the data packet may be refined so as to steer the data packet to the appropriate destination. In other systems, it may be more effective to perform all steering functions at the line card.

In addition to these optimizations, the application may also optimize its steering rules for a specific forwarding plane that will steer the data packet (box 78). However, regardless of where steering occurs, or how it occurs, the application-specific steering rules generated by the application allows for the optimization of system wide characteristics. The application is therefore able to derive an optimal implementation for the steering rules based on aspects of the system 10 that are considered optimal for steering its data packets.

As stated above, the application-specific steering rules, optimized as necessary or desired, are described in the extended BPF language and saved to a source file. The JIT compiler at the AS 30 then translates the BPF source code into an intermediate representation (i.e., byte code) (box 80), and compiles the representation into a code file 46 that is native to the platform of the PFE 20 (box 72). The JIT compiled code file 46 is then sent to the PFE 20 to configure the PFE 20 to steer incoming packets at runtime (box 84).

Figure 5:
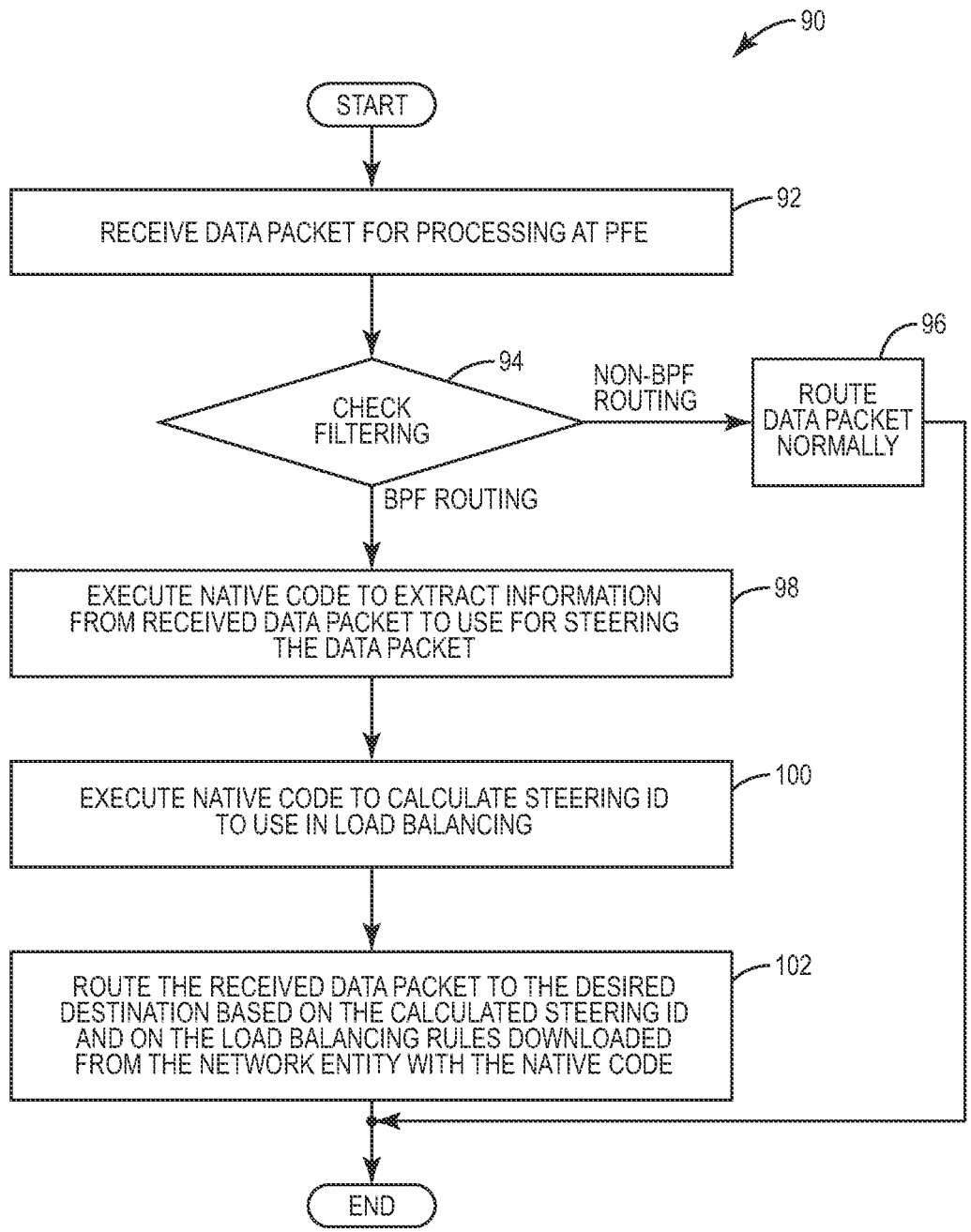
FIG. 5 is a flow chart illustrating an exemplary method of filtering and steering the packets received from the application using the JIT compiled BPF file according to one embodiment of the present invention.

FIG. 5 is a flow chart illustrating a method 90 of filtering and steering the packets received from the application using the JIT compiled code file 46 according to one embodiment of the present invention. Method 90 begins with the PFE 20 receiving a data packet generated by the application (box 92). As stated previously, the BPF filtering mechanism 40 at the PFE 20 first filters the incoming data packet to determine whether the data packet should be forwarded according to the application-specific BPF-based rule set (box 94). This may be accomplished, for example, by examining a predefined bit or bits carried with the incoming data packet. If the packet is not indicated for such BPF-based forwarding, the PFE 20 simply forwards the data packet based on the information contained in the FIB 24, as previously described (box 96). Otherwise, the data packet is forwarded to the code file 46 for processing.

Particularly, the extractor 48 first extracts information from a received data packet to use in steering the data packet (box 98). As stated previously, the extracted information may include one or more bits in one or more predefined locations. The extracted information is then used as input to the steering function 50. Particularly, the steering function 50 uses the extracted bits, in one embodiment, as an input to compute a steering ID to use for load balancing (box 100). The code file 46 then uses the computed steering ID as an index into the load balancer 52, and locates a corresponding steering rule defined by the application. The PFE 20 then forwards the data packet according to the destination specified by the located steering rule (box 102).

Figure 6:
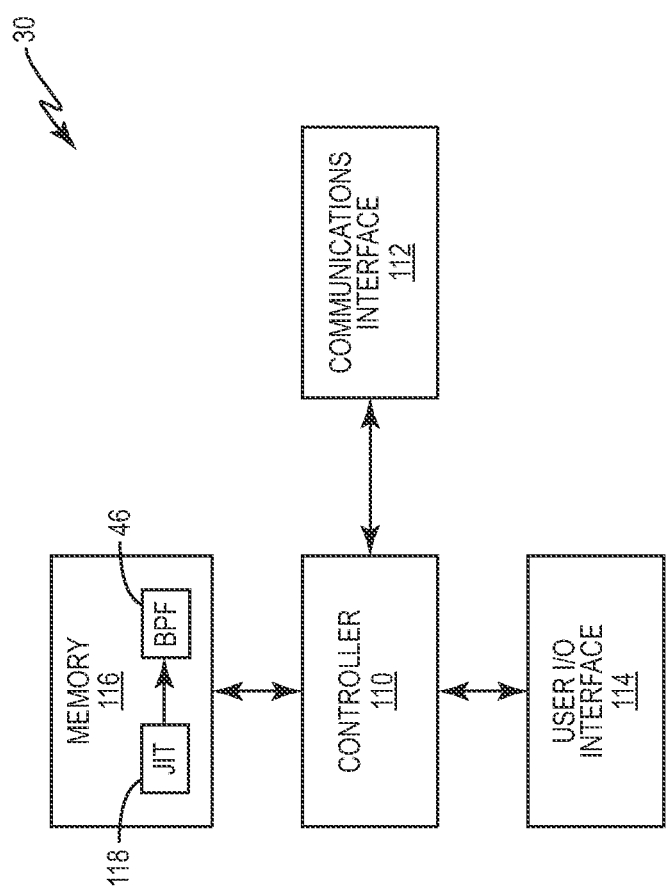
FIG. 6 is a functional block diagram illustrating some components of an exemplary network entity configured to compile a BPF file into native code used by a PFE to forward packets, and download the compiled file to one or more PFEs.

FIG. 6 is a functional block diagram of the AS 30 configured according to one embodiment of the present invention. As seen in FIG. 6, AS 30 comprises a programmable controller 110, a communications interface 112, a user I/O interface 114, and a memory 116, which may comprise solid state memory (e.g., ROM, DRAM, Flash, or a device capable of reading computer-readable media, such as optical or magnetic media).

The programmable controller 110 may comprise any of a variety of one or more programmable microprocessors that are configured to control the operation of AS 30 according to instructions and data stored in memory 116. Such instructions include, but are not limited to, the code necessary for performing communications functions, such as transmitting and receiving data packets to/from the PFE 20 and/or one or more of the servers 14, 16, 18 via IP network 12.

According to one or more embodiments of the present invention, the code and instructions also include a JIT compiler 118. As stated previously, the JIT compiler 118 compiles the BPF source code file generated by an application hosted at the AS 30 into the code file 46 that contains the native instructions to control the PFE 20 to steer data packets generated by the application to a desired destination. This code file 46, as stated previously, is downloaded to the PFE 20 to control how the PFE 20 steers the data packets generated by the application.

Figure 7:
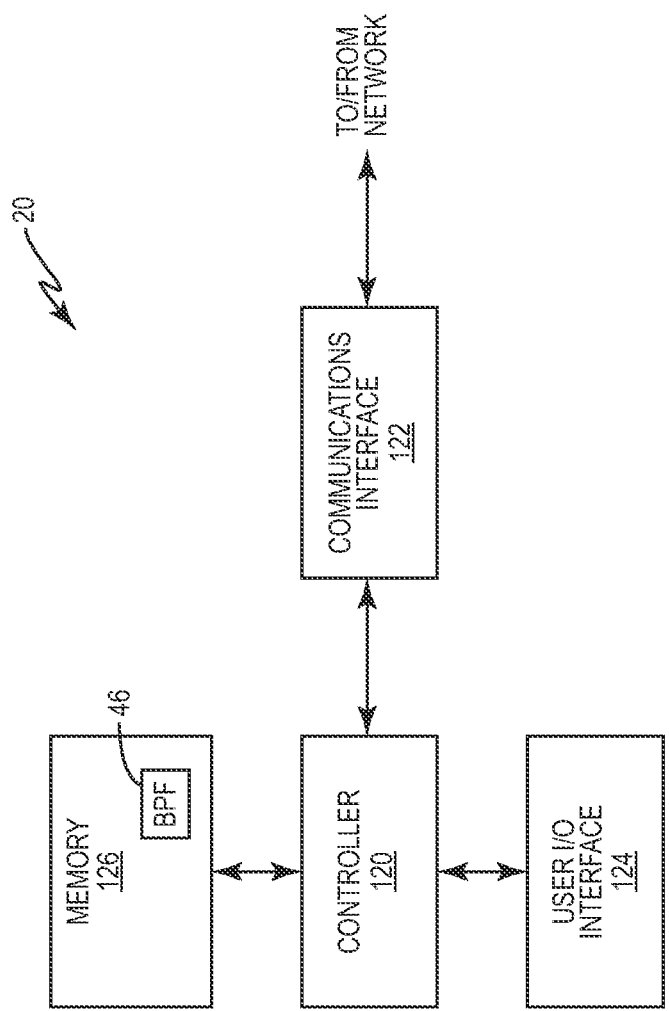
FIG. 7 is a functional block diagram illustrating some components of an exemplary network entity configured to steer data packets received from a given application based on a JIT compiled BPF file received from a network entity.

FIG. 7 is a functional block diagram of the PFE 20 configured according to one embodiment of the present invention. As seen in FIG. 7, PFE 20 comprises a programmable controller 120, a communications interface 122, a user I/O interface 124, and a memory 126. As above, memory 126 may comprise solid state memory (e.g., ROM, DRAM, Flash, or a device capable of reading computer-readable media, such as optical or magnetic media).

The programmable controller 120 may also comprise any of a variety of one or more programmable microprocessors that are configured to control the operation of PFE 20 according to instructions and data stored in memory 126. Such instructions include, but are not limited to, the code necessary for performing communications functions, such as transmitting and receiving data packets to/from the AS 30 and/or one or more of the servers 14, 16, 18 via IP network 12. The code and instructions also include a filtering mechanism 40 that is executed at the PFE for filtering and steering incoming data packets according to one or more embodiments of the present invention. Particularly, the PFE 20 receives a JIT compiled code file 46 from the AS 30 via the communications interface 122. The code file 46 contains the native instructions to control the programmable controller 120 to steer data packets generated by the application to a desired destination as previously described.

The present invention may, of course, be carried out in other ways than those specifically set forth herein without departing from essential characteristics of the invention. Therefore, the present embodiments are to be considered in all respects as illustrative and not restrictive, and all changes coming within the meaning and equivalency range of the appended claims are intended to be embraced therein.

What is claimed is:

1. A method for steering data packets through a communications network, the method performed at an application server and comprising:
    generating, at an application server, a source file to include a set of packet steering rules specific to a first application, the packet steering rules defining how a filtering mechanism at a packet forwarding entity (PFE) determines packets sent by the first application from among packets sent by a plurality of different applications to the PFE and steers the determined packets sent by the first application through the network;
    compiling, at an application server, the source file into a code file comprising instructions native to the PFE; and
    downloading the code file from the application server to the PFE to configure the filtering mechanism to steer incoming packets sent by the first application through the network according to the native instructions.

2. The method of claim 1 wherein generating a source file to include a set of packet steering rules further comprises generating the source file to include data associating a given incoming packet with one or more predetermined destinations in the network.

3. The method of claim 1 wherein generating a source file to include a set of packet steering rules further comprises generating the source file to identify information to be extracted from the incoming packets, and used as input into a steering function at the PFE.

4. The method of claim 3 further comprising identifying one or more fields in the incoming packets to extract and use as input into the steering function.

5. The method of claim 3 further comprising identifying one or more bits in the incoming packets to extract and use as input into the steering function.

6. The method of claim 1 wherein generating a source file to include a set of packet steering rules comprises generating the source file to include data identifying one or more load balancing policies of the network.

7. The method of claim 1 wherein generating a source file to include a set of packet steering rules comprises generating the source file to include data indicating one or more performance requirements of the first application that sent the incoming packets.

8. The method of claim 1 further comprising merging steering requirements from each of the plurality of different applications into a unified steering specification.

9. The method of claim 8 wherein generating a source file to include a set of packet steering rules comprises creating the set of packet steering rules for the first application based on the unified steering specification.

10. The method of claim 9 further comprising optimizing the set of packet steering rules for the first application based on the unified steering specification.

11. The method of claim 1 wherein generating a source file further comprises generating the source file to include a steering function to be executed by the filtering mechanism to steer the packets sent by the first application.

12. The method of claim 11 wherein generating a source file further comprises:
   generating the source file to further include multiple steering functions, each steering function to be executed by a corresponding PFE component to steer the incoming packet; and
   generating the source file to further include instructions defining how two or more of the PFE components will share the steering of the incoming packet.

13. The method of claim 1 wherein generating a source file further comprises generating the source file to include data optimizing the PFE to steer the incoming data packet.

14. The method of claim 1 wherein the set of packet steering rules is defined using an extended programming language associated with the filtering mechanism at the PFE, and wherein compiling the source file comprises:
   translating the source file to bytecode;
   using a Just-In-Time (JIT) compiler to compile the bytecode into the instructions native to the PFE; and
   outputting the compiled bytecode to the code file.

15. The method of claim 1 further comprising generating the packet steering rules on a per-application basis according to an Application Programming Interface (API) associated with the filtering mechanism at the PFE, the API including functions and data used to filter the incoming packets and to steer the incoming packets.

16. The method of claim 1 wherein compiling the source file further comprises:
   translating the source file to bytecode; and
   using a Just-In-Time (JIT) compiler to compile the bytecode into a plurality of different code files, each code file comprising instructions native to a respective PFE platform architecture.

17. The method of claim 16 wherein downloading the code file comprises downloading each code file to its corresponding PFE to configure the respective filtering mechanism to steer the incoming packets according to the respective native instructions.

18. An application server configured to steer application packets through a communications network, the application server comprising:
   a communications interface configured to communicate with a packet forwarding entity (PFE) that steers application packets through the network;
   a memory configured to store a compiler; and
   a controller configured to:
   generate a source file to include a set of packet steering rules specific to a first application, the packet steering rules defining how a filtering mechanism at the PFE determines packets sent by the first application from among packets sent by a plurality of different applications to the PFE and steers the determined packets sent by the first application through the network;
   compile the source file into a code file comprising instructions native to the PFE; and
   download the code file from the application server to the PFE to configure the filtering mechanism to steer incoming packets sent by the first application through the network according to the native instructions.

19. The application server of claim 18 wherein the controller is further configured to generate the source file to include data associating a given incoming packet with one or more predetermined destinations in the network.

20. The application server of claim 18 wherein the controller is further configured to generate the source file to identify information to be extracted from the incoming packets, and used as input into a steering function at the PFE.

21. The application server of claim 20 wherein the controller is further configured to identify one or more fields in the incoming packets to extract and use as input into the steering function.

22. The application server of claim 20 wherein the controller is further configured to identify one or more bits in the incoming packets to extract and use as input into the steering function.

23. The application server of claim 18 wherein the controller is further configured to generate the source file to include data identifying one or more load balancing policies of the network.

24. The application server of claim 18 wherein the controller is further configured to generate the source file to include data indicating one or more performance requirements of the first application that sent the incoming packets.

25. The application server of claim 18 wherein the controller is further configured to merge steering requirements from each of the plurality of different applications into a unified steering specification, and store the unified steering specification in the memory.

26. The application server of claim 25 wherein the controller is further configured to create the set of packet steering rules for the first application based on the unified steering specification.

27. The application server of claim 26 wherein the controller is further configured to optimize the set of packet steering rules for the first application based on the unified steering specification.

28. The application server of claim 18 wherein the controller is further configured to generate the source file to include a steering function to be executed by the filtering mechanism to steer the packets sent by the first application.

29. The application server of claim 28 wherein the controller is further configured to:
generate the source file to further include multiple steering functions, each steering function to be executed by a corresponding PFE component to steer the incoming packet; and
generate the source file to further include instructions defining how two or more of the PFE components will share the steering of the incoming packet.

30. The application server of claim 18 wherein the controller is further configured to generate the source file to include data optimizing the PFE to steer the incoming data packet.

31. The application server of claim 18 wherein the controller is further configured to:
define the set of packet steering rules using an extended programming language associated with the filtering mechanism at the PFE; and
compile the source file by:
translating the source file to bytecode;
using a Just-In-Time (JIT) compiler to compile the bytecode into the instructions native to the PFE; and
outputting the compiled bytecode to the code file.

32. The application server of claim 18 wherein the controller is further configured to generate the packet steering rules on a per-application basis according to an Application Programming Interface (API) associated with the filtering mechanism at the PFE, the API including functions and data used to filter the incoming packets and to steer the incoming packets through the network.

33. The application server of claim 18 wherein the controller is further configured to compile the source code by:
translating the source file to bytecode; and
using a Just-In-Time (JIT) compiler to compile the bytecode into a plurality of different code files, each code file comprising instructions native to a respective PFE platform architecture.

34. The network entity of claim 33 wherein the controller is further configured to download each code file to its corresponding PFE to configure the respective filtering mechanism to steer the incoming packets according to the respective native instructions.

35. A method for steering data packets through a communications network, the method performed at a Packet Forwarding Entity (PFE) comprising:
receiving, at a Packet Forwarding Entity (PFE), a code file compiled into native instructions for the PFE, the code file including a set of packet steering rules, specific to a first application, created by an application server and received at the PFE which defines how a filtering mechanism at the PFE determines application packets sent by the first application from among packets sent by a plurality of different applications to the PFE and steers application packets through the network;
thereafter, receiving an incoming packet from the first application;
filtering the incoming packet based on a filter indicator in the incoming packet; and
steering the incoming packet to a destination server according to the native instructions.

36. The method of claim 35 wherein the native instructions comprise an application-defined steering function, and wherein filtering the incoming packet comprises determining, based on the filter indicator, whether to forward the incoming packet to the steering function.

37. The method of claim 36 wherein steering the incoming packet comprises:
extracting information from the incoming packet based on the native instructions; and
inputting the extracted information into the steering function.

38. The method of claim 37 wherein steering the incoming packet further comprises:
computing an identifier for the incoming packet using the steering function;
mapping the computed identifier to a corresponding index associated with the destination server; and
forwarding the incoming packet to the destination server.

39. The method of claim 35 wherein steering the incoming packet comprises steering the application packet according to the native instructions to balance a load in the network.

40. The method of claim 35 further comprising optimizing a steering function that steers the incoming packet according to the native instructions.

41. The method of claim 35 wherein the native instructions comprise one or more optimizations for splitting the steering of the incoming packet among a plurality of functional components at the PFE.

42. A Packet Forwarding Entity (PFE) configured to steer data packets through a communications network, the PFE comprising:
a communications interface configured to:
receive incoming packets from a first application; and
receive a compiled code file from an application server associated with the first application, the compiled code file comprising a set of packet steering rules specific to the first application defining how to determine the incoming packets sent by the first application from among packets sent by a plurality of different applications to the PFE and steer the incoming packets through the network, and compiled into native instructions for the PFE;
a filtering mechanism; and
a controller configured to control the filtering mechanism to:
filter the incoming packet based on a filter indicator included in the incoming packet; and
steer the incoming packet to a destination server according to the native instructions.

43. The PFE of claim 42 wherein the native instructions comprise a packet steering function defined by the application server, and wherein the controller is configured to control the filtering mechanism to determine, based on the filter indicator, whether to forward the incoming packet to the packet steering function.

44. The PFE of claim 43 wherein the packet steering function is configured to:
extract information from the incoming packet based on the native instructions; and
use the extracted information as input to steer the incoming packet through the network.

45. The PFE of claim 44 wherein the packet steering function is further configured to:
compute an identifier for the incoming packet;

map the computed identifier to a corresponding index associated with the destination server; and forward the incoming packet to the destination server based on the mapping.

46. The PFE of claim 42 wherein the packet steering function is further configured to steer the incoming packet according to the native instructions to balance a load in the network.

47. The PFE of claim 42 wherein the steering function comprises one or more optimizations to steer the incoming packet.

48. The PFE of claim 42 wherein the native instructions comprise one or more optimizations for splitting the steering of the incoming packet among a plurality of functional components at the PFE.

\* \* \* \* \*